INVENTOR.
HENRI G. BUSIGNIES
BY
R P Morris
ATTORNEY

Patented Dec. 30, 1947

2,433,341

UNITED STATES PATENT OFFICE 2,433,341

RADIO NAVIGATION SYSTEM AND METHOD

Henri G. Busignies, Forest Hills, N. Y., assignor to Federal Telephone and Radio Corporation, New York, N. Y., a corporation of Delaware Application May 1, 1944, Serial No. 533,465

5 Claims. (Cl. 250—1.62)

This invention relates to radio navigation systems and more particularly to radio distance and direction indicating systems suitable for simultaneous use by a plurality of aircraft.

Systems for controlling aircraft navigation have been proposed wherein the position of a craft relative to one or more fixed locations is obtained by the timing of pulses transmitted from the craft to the fixed locations and received again on the craft after repeating at the fixed locations. However, in these previously proposed systems a high degree of stability in the pulse recurrence frequency is required. Furthermore, these proposed systems are not well adapted for simultaneous use by a plurality of different aircraft.

It is a principal object of my invention to provide a simple radio distance indicating system and method suitable for navigation.

It is a further object of my invention to provide a simple system and method by which each of a plurality of aircraft may determine their distances from one or more fixed locations and simultaneously obtain a directional reading with respect to said stations.

It is a still further object of my invention to provide a navigation equipment which requires on the craft very little additional indicating apparatus.

According to a feature of my invention, I provide on an aircraft, pulsing equipment for transmitting relatively widely spaced pulses on the same radio frequency carrier. These pulses from each of the craft are received on a single repeater apparatus which serves to repeat the pulses in the same order in which they are received. The pulses are received back on the various craft and are applied to an indicator, for example, a cathode ray type indicator to indicate the distance of the craft from the repeater station. In order that each craft may receive its own indication to the exclusion of those pulses repeated from the other craft, the trains of pulses transmitted from each craft are given a different recurrence frequency characteristic. For example, the recurrence or repetition frequency of the pulses may be wobbled at different fixed or random rates on the different craft so that they normally will not coincide, or different repetition frequencies may be used by each craft. The distance indicator on each craft will be triggered to provide a reference point depending upon each transmitted pulse. Consequently, the pulses received from the other craft with different timings will not cumulatively effect the indicator and will be easily distinguished from the desired distance indications. On the aircraft, the normal communication transmitter may be used, if desired, for transmitting these timing pulses so that only the pulse generator and the indicating apparatus need be added.

In addition to the distance indication the aircraft receiver may be provided with a directive antenna so that a directional indication may be obtained at the same time that the distance indication is being made. Thus, a craft may be able to ascertain its distance and direction with respect to a single station so that its position will be accurately defined. Alternatively or in conjunction with the direction and distance indication, measurements may be made from two or more spaced repeater stations so that the position of the craft may be checked by a triangulation method.

A better understanding of my invention and the objects and features thereof may be had from the particular description of an embodiment made with reference to the accompanying drawings in which.

Figure 1:
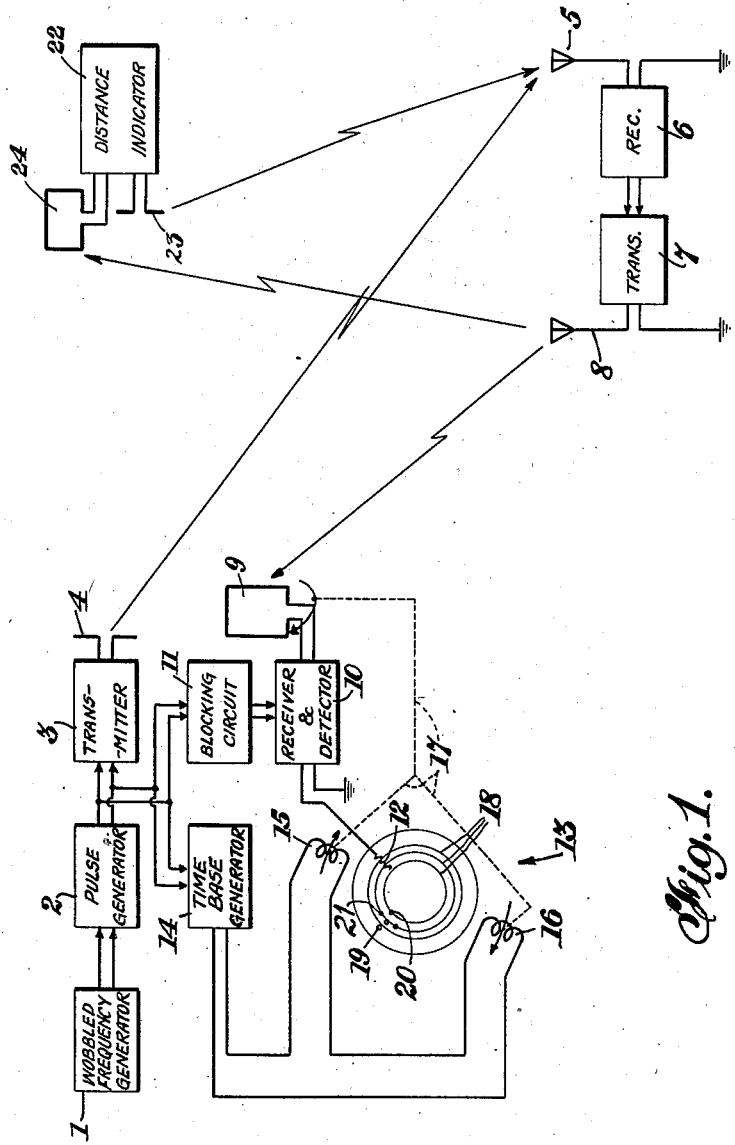
Fig. 1 is a block circuit diagram illustrating the relationship of the craft equipment and the repeater station.

Turning first to Fig. 1, the aircraft equipment may comprise a wobbled frequency generator 1, which serves to energize pulse generator 2. The pulses from pulse generator 2 are applied to transmitter 3 so that radio frequency pulses are transmitted from antenna 4. These radio frequency pulses are received on antenna 5 and applied to a receiver 6. The output pulses from receiver 6 serve to trigger a transmitter 7 which radiates from antenna pulses corresponding to those received on the receiving antenna 5. Preferably the receiver 6 is blocked by the received signals in any known manner for a short period while pulses are being transmitted in order to avoid signaling. Pulse energy from antenna 8 is received on antenna 9 which may be a rotatable directional receiving antenna, as shown. Although a single loop antenna is illustrated, any other known type of directional antenna or array may be used. These received pulses are applied to receiver detector 10 which serves to produce output pulses of the envelope of the pulse trains received on antenna 9. In order to prevent the transmitter directly affecting the receiver, a blocking circuit 11 to the output of pulse generator 2, serves to block receiver detector 10 during the periods of transmission from antenna 4.

The detected pulses in the receiver 10 are applied to a control grid 12 of a cathode ray oscilloscope 13. Grid 12 is preferably biased so that in the absence of pulses applied from receiver 10, the intensity of cathode ray beam will be reduced. For the operation of the oscilloscope to determine distance, energy from pulse generator 2 is applied to a time base generator 14 which serves to apply a time base potential to deflection coils 15, 16. Deflection coils 15 and 16 are arranged for rotation about the cathode ray oscilloscope 13 simultaneously with rotation of antenna 9, as indicated by broken lines 17. As a consequence, the cathode ray beam is deflected radially across the screen of the oscilloscope by potential applied to coils 15, 16, and is rotated angularly about the screen with the rotating directive antenna. Thus, in response to energy received on antenna 9, a spot or series of spots of light will be made to appear, as shown at 19. This spot will appear radially displaced from the center in accordance with the distance of the craft from the single repeater station, and will be angularly displaced in accordance with the directional antenna 9. The distance of the craft from the repeater will be indicated by this radial displacement on the distance scale indicated by the concentric circles 18. Other repeated pulses and directly transmitted pulses from the other craft, received on antenna 9 will occur at different timing intervals corresponding to different distance indications, as shown by the spots 20, 21, outlined in light lines on the oscilloscope screen. In fact, since the wobbled or recurrence rate changes from the various craft are completely unsynchronized with respect to any other craft, these spots such as 20, 21, may appear only a single time in one position and will not produce readable indications on the screen.

Other craft, as shown at 22, are equipped with their own distance and direction indication equipment similar to that specifically described above, and are provided with transmitting antennas 23 and receiving antennas 24. A plurality of such craft may simultaneously transmit pulses at different repetition rates, to the repeater station and each will produce its own indications as distinguished from those of other crafts.

The use of the directional antenna with the pulse repeater system serves to provide sharper directional indication free from reflection errors than would be obtained for long continued waves. Any pulse, reaching antenna 9, after reflection from other obstacles, will appear at a different point on the distance scale from the pulses directly transmitted to the receiver without reflection. Any pulse received after reflection will arrive at a later time and will give the appearance of coming from a greater distance than the directly received pulse, so that the indication of the shortest distance will usually be the pulse to read for direction finding purposes. Furthermore, the reflected pulses are much weaker and will not show up as brightly as does the directly received pulse indication.

It should be understood that for direction finding, the antennas such as 9 or 24 are rotated relatively slowly with respect to the pulse repetition rates so that the pulses have ample time to traverse the distance from the craft to the repeater and back before any appreciable change in the angular position of the rotary directional antenna occurs.

Figure 2:
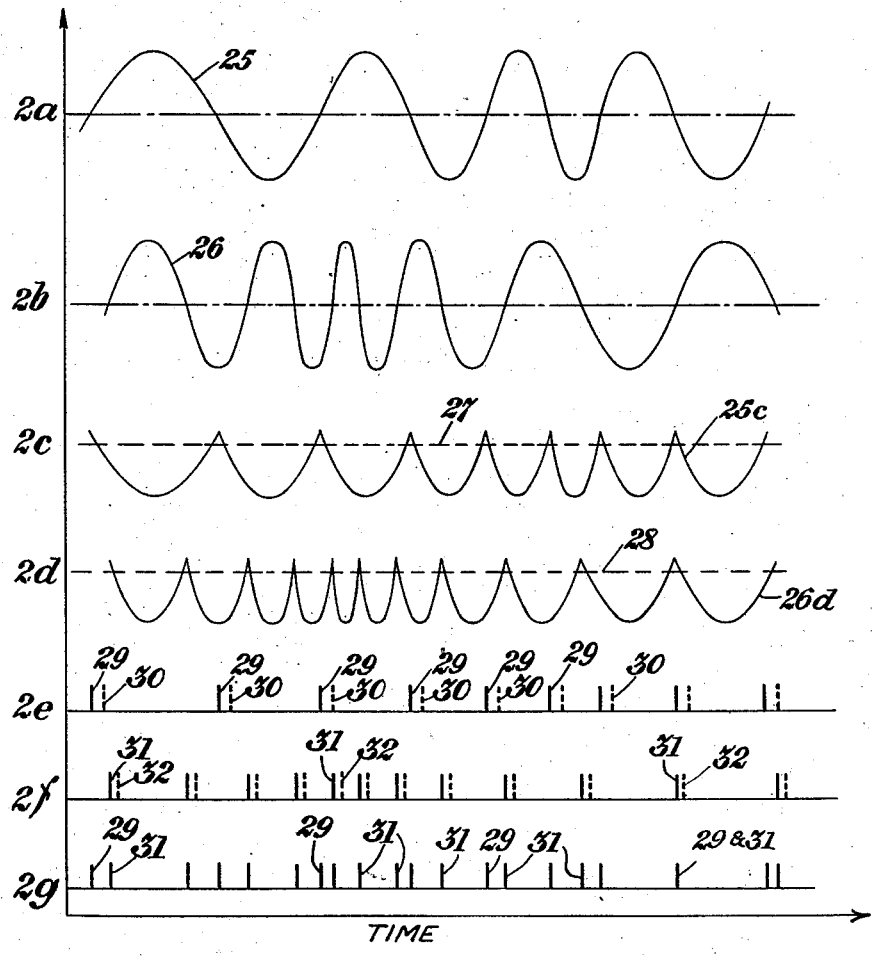
Fig. 2 is a set of curves used in explaining the operation of my invention.

Referring to Fig. 2, an explanation of the manner in which the pulses from different craft may be variably transmitted at variable repetition rates, is explained. Curves 2a, 2b of Fig. 2, shown at 25, 26, may represent two waves produced by different craft in different wobbled frequency generators such as generator 1 of Fig. 1. Rectification of these waves produces the curves shown at 2c, 2d, indicated by reference characters 25c and 26d, respectively. These rectified waves may be clipped at the respective clipping levels 27 and 28 to produce resultant pulses, as shown in curves 2e, 2f. In curve 2e, the resultant pulses from curve 25c are shown at 29, and at 30 are shown the retransmitted received pulses on the corresponding indicator receiver. In curve 2f, pulses 31 represent the resultant pulses from curve 26d and pulses 32 represent the retransmitted pulses from this series which may be received at the same indicator as received pulses 30. The composite wave received on the receiver at the single repeater station is indicated by curve 2g. It will be observed that the pulses 29 and 31 are here related to one another in a random manner.

Figure 3:
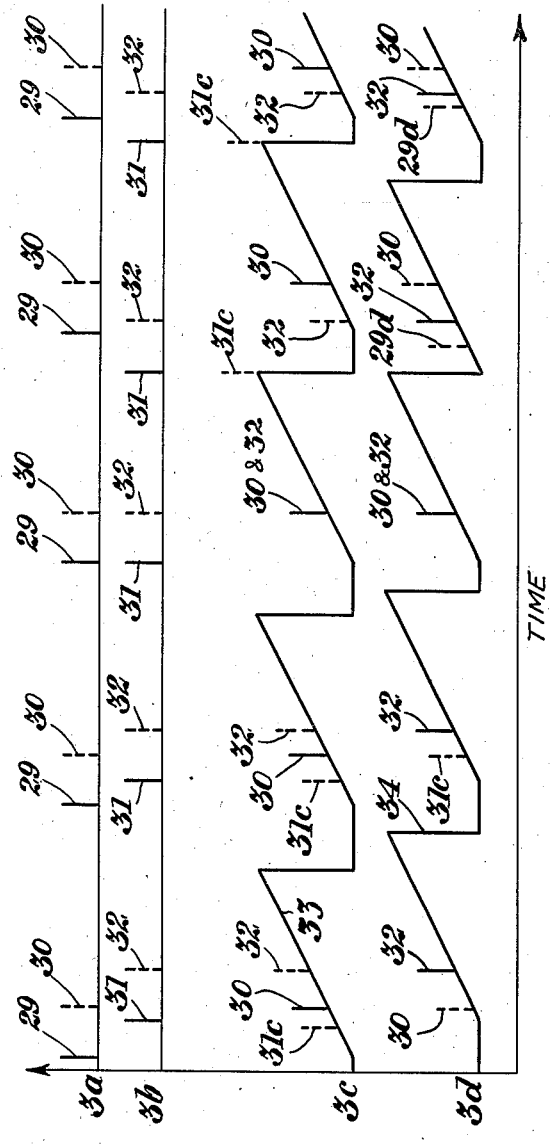
Fig. 3 is a further set of curves on a larger scale illustrating the distance finding principles of my invention.

A clearer understanding of the operation of the indicators may be had by reference to Fig. 3 showing on a greatly exaggerated scale the relation of two craft systems to one another. In this figure curves 3a, 3b, show on an enlarged scale the time relationship of the transmitted pulses 29, 31 at the repeater and the repeated pulses 30, 32 at a single craft. It will be noted that the spacing between pulses 29 and 30 and between 31 and 32 are shown to be the same since time for a pulse to travel from the single repeater to any single receiver will be the same regardless of where the pulses which trigger the repeater come from. If we assume first, an indicator located on a craft which produces the series of pulses 29, the sweep of this indicator may be represented, for example, by the saw-tooth wave 33 of curve 3c. On this saw-tooth wave pulses 30 occur at a fixed distance from the origin of the sweep in every case, while pulses 31C and 32 representing the directly received pulses, and the corresponding received retransmitted pulses, respectively, appear at various spaced points along this curve. Pulse 31C will generally differ from the position shown in curve 3b because of the differing distance between craft. At one position in curve 3c pulses 30 and 32 coincide. However, the occasional coincidence will not adversely effect the reading on the indicators. In curve 3d, is shown a saw-tooth wave 34 similar to wave 33 representing the indicator sweep on the craft at which pulses 31 originate. Here it will be noted, pulses 32 occur at relatively fixed positions on the saw-tooth waves 34, while pulses 29d and 30 are variably displaced.

Figure 4:
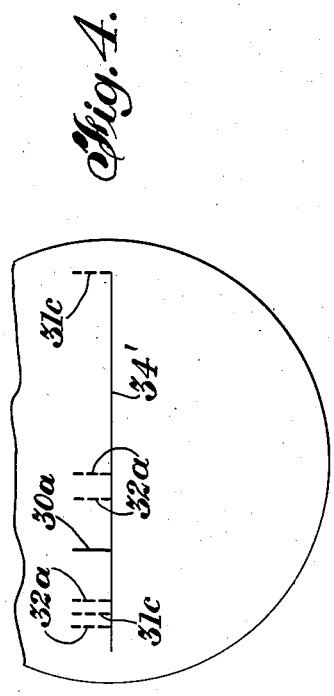
Fig. 4 is a fragmentary view of a cathode ray oscilloscope screen showing how the distance indications are separately cumulatively indicated.

In Fig. 4 is shown the screen of a simple form of cathode ray distance indicator in which the sweep 34' is made in a rectilinear fashion under the control of a saw-tooth wave, such as shown at 33. Assuming that this is the sweep according to the wave curve 3c the indications 30a corresponding to pulses 30 all occur at a relatively fixed distance along the sweep. Thus, a cumulative effect is produced making pulses 30a stand out brightly. However, pulses 32a, corresponding to the variable position of repeated pulses 32, and pulses 31C representing directly received pulses 31, are spread out along the scale and, as a consequence, will be very much dimmer than will be the indication 30a.

While I have described a specific embodiment of my invention in which the pulses transmitted from separate receivers are transmitted at variable repetition rates under control of a wobbled frequency generator, it should be understood that this feature is not necessary to the operation of the invention. If the transmitters on each of the craft operate at different fixed repetition rates, the timing circuits will still segregate to a large extent the wanted pulses from the unwanted pulses and thus will produce the desired indication. Such a circuit may be represented merely by omitting the wobbled frequency generator illustrated in Fig. 1.

It should be further understood that the separate pulse generators need not be controlled in synchronism but may be permitted to operate at relatively random pulsing rates. In such a system the occurrence of simultaneous reception of pulses at the repeater will likewise be relatively small. It should further be understood that desired separate direction and distance indicators may be provided instead of the combined direction and indicating arrangement illustrated. Many other modifications of my invention will readily occur to those skilled in the art. Accordingly, the description of the specific embodiment and modifications thereof is not intended as a limitation on my invention, as set forth in the objects of my invention.

What is claimed is:

1. In a system in which a plurality of craft may each simultaneously obtain indications of its distance from a single station by repetition of pulse trains, a method of distinguishing the respective indications at each craft from indications produced by the repeated pulse trains from other craft, comprising transmitting individual pulse trains from each craft, giving to the pulses of said trains distinctive characteristic repetition rates including varying such repetition rates, receiving and retransmitting all said pulse trains at said single station, receiving retransmitted pulse trains on each of said craft, and producing identification of each of said craft timed with respect to the separate pulses of the train of pulses transmitted from each of said craft, whereby the repeated pulses from the pulse train transmitted from each craft produce cumulative indications on the corresponding craft which distinguish from the received pulses of other craft.

2. In a system in which a plurality of craft may each simultaneously obtain indications of its distance from a single station by repetition of pulse trains, a method of distinguishing the respective indications at each craft from indications produced by the repeated pulse trains from other craft, comprising transmitting individual pulse trains from each craft, giving to the pulses of said trains distinctive characteristic repetition rates including varying the timing of said pulses at randomly related variable repetition rates, receiving and retransmitting all said pulse trains at said single station, receiving said retransmitted pulse trains on each of said craft, and producing an indication on each of said craft timed with respect to the separate pulses of the train of pulses transmitted from each of said craft, whereby the repeated pulses from the pulse train retransmitted from each craft produce cumulative indications on the corresponding craft which distinguish from the received pulses of other craft.

3. In a system in which a plurality of craft may each simultaneously obtain indications of its distance from a single station by repetition of pulse trains, a method of distinguishing the respective indications at each craft from indications produced by the repeated pulse trains from other craft, comprising transmitting individual pulse trains from each craft, giving to the pulses of said trains distinctive characteristic repetition rates including varying the timing of said pulses at different repetition rates, receiving and retransmitting all said pulse trains at said single station, receiving said retransmitted pulse trains on each of said craft, and producing an indication on each of said craft timed with respect to the separate pulses of the train of pulses transmitted from each of said craft, whereby the repeated pulses from the pulse train transmitted from each craft produce cumulative indications on the corresponding craft which distinguish from the received pulses of other craft.

4. A system for obtaining simultaneously, on each of a plurality of craft, indications of its distance from a single station by means of repeated pulses on a common radio frequency, comprising means for transmitting from each craft trains of pulses, control means for giving to the pulses of each train randomly related variable repetition rates, means at said single station for receiving the pulses from all said trains and repeating them at substantially the same repetition rates at which they are received, means on each of said craft for receiving said repeated pulses, indicator means on each of said craft, timing means responsive to the pulses transmitted from each of said craft for providing a time reference scale on said indicator, means for applying said received pulses to said indicator, whereby said indicator under control of said timing means will provide a cumulative indication of the repeated pulses corresponding to the respective transmitted pulse train.

5. A system for obtaining simultaneously, on each of the plurality of craft, indications of its distance from a signal station by means of repeated pulses on a common radio frequency, comprising means for transmitting from each craft trains of pulses, control means for giving to the pulses of each train differently, variably timed repetition rates, means at said single station for receiving the pulses from all said trains and repeating them at substantially the same repetition rates at which they are received, means on each said craft for receiving said repeated pulses, indicator means on each of said craft, timing means responsive to the pulses transmitted from each of said craft for providing a time reference scale on said indicator, and means for supplying said received pulses to said indicator, whereby said indicator under control of said timing means will provide a cumulative indication of the repeated pulses corresponding to the respective transmitted pulse train.

HENRI G. BUSIGNIES.

REFERENCES CITED

The following references are of record in the file of this patent:

UNITED STATES PATENTS

| Number | Name | Date |
| --- | --- | --- |
| 2,143,035 | Smith | Jan. 10, 1939 |
| 2,134,716 | Gunn | Nov. 1, 1938 |
| 2,248,215 | Budenbom | July 8, 1941 |
| 2,252,083 | Luck | Aug. 12, 1941 |

FOREIGN PATENTS

| Number | Country | Date |
| --- | --- | --- |
| 520,778 | Great Britain | May 3, 1940 |